(12) United States Patent
Liu et al.

(10) Patent No.: US 10,496,785 B2
(45) Date of Patent: Dec. 3, 2019

(54) CHEMICAL MECHANICAL POLISHING SIMULATION METHODS AND SIMULATION DEVICES THEREOF

(71) Applicants: Semiconductor Manufacturing International (Shanghai) Corporation, Shanghai (CN); Semiconductor Manufacturing International (Beijing) Corporation, Beijing (CN)

(72) Inventors: Zheng Fang Liu, Shanghai (CN); Xue Li, Shanghai (CN)

(73) Assignees: Semiconductor Manufacturing International (Shanghai) Corporation, Shanghai (CN); Semiconductor Manufacturing International (Beijing) Corporation, Beijing (CN)

( * ) Notice: Subject to any disclaimer, the term of this patent is extended or adjusted under 35 U.S.C. 154(b) by 404 days.

(21) Appl. No.: 15/482,880

(22) Filed: Apr. 10, 2017

(65) Prior Publication Data

US 2017/0293711 A1 Oct. 12, 2017

(30) Foreign Application Priority Data

Apr. 11, 2016 (CN) .......................... 2016 1 0221234

(51) Int. Cl.
*G06F 17/50* (2006.01)
*G06F 17/11* (2006.01)
(Continued)

(52) U.S. Cl.
CPC .......... *G06F 17/5086* (2013.01); *G06F 17/11* (2013.01); *G06F 17/18* (2013.01);
(Continued)

(58) Field of Classification Search
CPC ...... G06F 17/5086; G06F 17/11; G06F 17/18; G06F 17/5009; G06F 2217/16; H01L 21/30625
See application file for complete search history.

(56) References Cited

U.S. PATENT DOCUMENTS 6,484,300 B1 * 11/2002 Kim .................... G06F 17/5018
716/51
7,509,622 B2 * 3/2009 Sinha .................. G06F 17/5068
700/119
(Continued)

OTHER PUBLICATIONS

Fang, Jingxun, Zhibiao Mao, Yu Zhang, Sheng Ni, Quan Chen, Shirui Yu, Tong Lei et al. "Modeling of Cu-CMP and Its Application for Hotspot Prediction." ECS Journal of Solid State Science and Technology 3, No. 5 (2014): p. 126-p. 132. (Year: 2014).*
(Continued)

*Primary Examiner* — Rehana Perveen
*Assistant Examiner* — Chuen-Meei Gan
(74) *Attorney, Agent, or Firm* — Anova Law Group, PLLC (57) ABSTRACT

A CMP simulation method includes inputting a chip pattern layout including a plurality of graphic patterns, partitioning the chip pattern layout into targeting grids including a plurality of surrounding grids, and then calculating grid geometry characteristics of the targeting grids. The method also includes generating shifted grids by shifting the targeting grids, calculating weighted average grid geometry characteristics of the targeting grids and the shifted grids, and locating first hot spots on the chip pattern layout by performing a CMP simulation based on the grid geometry characteristics of the targeting grids. Further, the method includes generating optimized grid geometry characteristics by modifying the grid geometry characteristics of the targeting grids based on the weighted average grid geometry (Continued)

characteristics and the defined first hot spots, and then locating second hot spots on the chip pattern layout by performing the CMP simulation based on the optimized grid geometry characteristics.

18 Claims, 5 Drawing Sheets

(51) Int. Cl.
*G06F 17/18* (2006.01)
*H01L 21/306* (2006.01)

(52) U.S. Cl.
CPC .... *G06F 17/5009* (2013.01); *H01L 21/30625* (2013.01); *G06F 2217/16* (2013.01)

(56) References Cited

U.S. PATENT DOCUMENTS

| | | | |
|---|---|---|---|
| 2009/0031271 A1* | 1/2009 | White | G06F 17/5068 716/122 |
| 2015/0143324 A1* | 5/2015 | Wang | G06F 17/5077 716/135 |
| 2016/0155722 A1* | 6/2016 | Leedy | H01L 25/0657 257/686 |
| 2016/0162626 A1* | 6/2016 | Herrmann | G06F 17/5081 716/51 |

OTHER PUBLICATIONS

Helen Li et al,"Characterization of shallow trench isolation CMP process and its application," Proc. SPIE 9781, Design-Process-Technology Cooptimization for Manufacturability X, 978113 (Mar. 16, 2016); (Year: 2016).*

The European Patent Office (EPO) The Extended European Search Report for 17164955.1 dated Nov. 8, 2017 10 Pages.

Yoo-Hyon Kim et al: "CHAMPS (chemical-mechanical planarization simulator)", Simulation of Semiconductor Processes and Devices, 2000. SISPAD 2000. 2000 International Conference on Sep. 6-8, 2000, Piscataway, NJ, USA, IEEE, Sep. 6, 2000 (Sep. 6, 2000), pp. 123-126, XP010513042, ISBN: 978-0-7803-6279-6.

Rodriguez N et al: "Hotspot Prevention Using CMP Model in Design Implementation Flow 11", Quality Electronic Design, 2008. ISQED 2008. 9th International Symposium On. IEEE. Piscataway. NJ, USA, Mar. 17, 2008 (Mar. 17, 2008), pp. 365-368, XP031239550, ISBN: 978-0-7695-3117-5.

* cited by examiner

CHEMICAL MECHANICAL POLISHING SIMULATION METHODS AND SIMULATION DEVICES THEREOF

CROSS-REFERENCES TO RELATED APPLICATIONS

This application claims the priority of Chinese Patent Application No. CN201610221234.8, filed on Apr. 11, 2016, the entire content of which is incorporated herein by reference.

FIELD OF THE DISCLOSURE

The present disclosure generally relates to the field of polishing technology and, more particularly, relates to chemical mechanical polishing simulation methods and simulation devices thereof.

BACKGROUND

Chemical mechanical polishing (CMP) process is a mainstream planarization process in current semiconductor fabrication technology. Specifically, CMP process uses a method combining chemical grinding material with mechanical polishing to planarize the surface of wafer. In general, the mechanism of CMP process is as follows: a large amount of polishing fluid containing quartz sand particles is disposed on a polishing pad; materials on the surface of the wafer, especially on the protruding areas of the wafer, may react with the polishing fluid, and thus form a surface layer that can be easily removed; as the surface of the wafer moves relative to the polishing pad, the surface layer may be mechanically removed under the pressure applied by the polishing particles, and as a result, the surface of the wafer may be planarized.

Because the CMP process utilizes the interplay of chemical reaction and physical removal as well as other effects, the CMP process may be affected by many factors, such as the size of the polishing particles, the property of the polishing pad, the applied pressure, the relative speed between the polishing pad and the wafer, etc. Such factors may all have significant influence on the surface profile of the chip obtained after the CMP process. In some cases, when one or more of the above factors are not in the optimal condition, the planarization process may not reach desired results.

In order to reduce the production cost of a CMP process, a reasonable prediction on the surface profile of the chip to be obtained after the CMP process may be required. Specifically, hot spots that may appear on the chip surface may be pre-evaluated. Such hot spots may be the spots where the thickness of the pattern on the chip surface exceeds a predetermined thickness range, or where the difference between the height of the pattern on the chip surface and the height of a reference plane exceeds a predetermined height range, including microscopically raised and recessed spots on the chip surface. Hot spots may lead to a number of problems such as short circuits caused by material residue of the CMP process, graphic bridging due to the height difference on the surface of the silicon wafer exceeding the process window of the photolithography process, the resistance and capacitance values exceeding specifications during electrical testing of the wafer, etc. The surface profile of a wafer to be obtained after a CMP process is usually predicted by CMP simulation software.

According to existing technology, the flow to predict the surface profile of a wafer after a CMP process usually includes inputting a chip pattern layout, grid-partitioning the chip pattern layout, calculating the pattern characteristics of the grids, using the calculated grid geometry characteristics as parameters in the CMP simulation software to simulate the CMP process, and finally, outputting the hot spots.

However, using the existing method described above to predict the surface profile of a chip obtained after a CMP process may often lead to inaccurate predictions. The disclosed CMP simulation method and the simulation device are directed to solve one or more problems set forth above and other problems in the art.

BRIEF SUMMARY OF THE DISCLOSURE

One aspect of the present disclosure includes a chemical mechanical polishing (CMP) simulation method. The CMP simulation method includes inputting a chip pattern layout including a plurality of graphic patterns, partitioning the chip pattern layout into targeting grids including a plurality of surrounding grids, and then calculating grid geometry characteristics of the targeting grids. The CMP simulation method also includes generating shifted grids by shifting the targeting grids, calculating weighted average grid geometry characteristics of the targeting grids and of the shifted grids, and locating first hot spots on the chip pattern layout by performing a CMP simulation based on the grid geometry characteristics of the targeting grids. Further, the CMP simulation method includes generating optimized grid geometry characteristics by modifying the grid geometry characteristics of the targeting grids based on the weighted average grid geometry characteristics and the defined first hot spots, and then locating second hot spots on the chip pattern layout by performing the CMP simulation based on the optimized grid geometry characteristics.

Another aspect of the present disclosure provides a CMP simulation device. The CMP simulation device includes a chip pattern layout input module, a targeting grids data module, a hot spot location module, a grids shift data module, and a grid geometry characteristic optimization module. The chip pattern layout input module is configured to input a chip pattern layout including a plurality of graphic patterns. The targeting grids data module is configured to partition the chip pattern layout into targeting grids and also calculates grid geometry characteristics of the targeting grids. The hot spot location module is configured to perform a CMP simulation to locate first hot spots on the chip pattern layout based on the grid geometry characteristics of the targeting grids. The grids shift data module is configured to shift the targeting grids and generate shifted grids and also calculates weighted average grid geometry characteristics of the targeting grids and the shifted grids. The grid geometry characteristic optimization module is configured to generate optimized grid geometry characteristics by modifying the grid geometry characteristics of the targeting grids based on the weighted average grid geometry characteristics and the defined first hot spots. Moreover, the hot spot location module also performs the CMP simulation to locate second hot spots on the chip pattern layout based on the optimized grid geometry characteristics.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
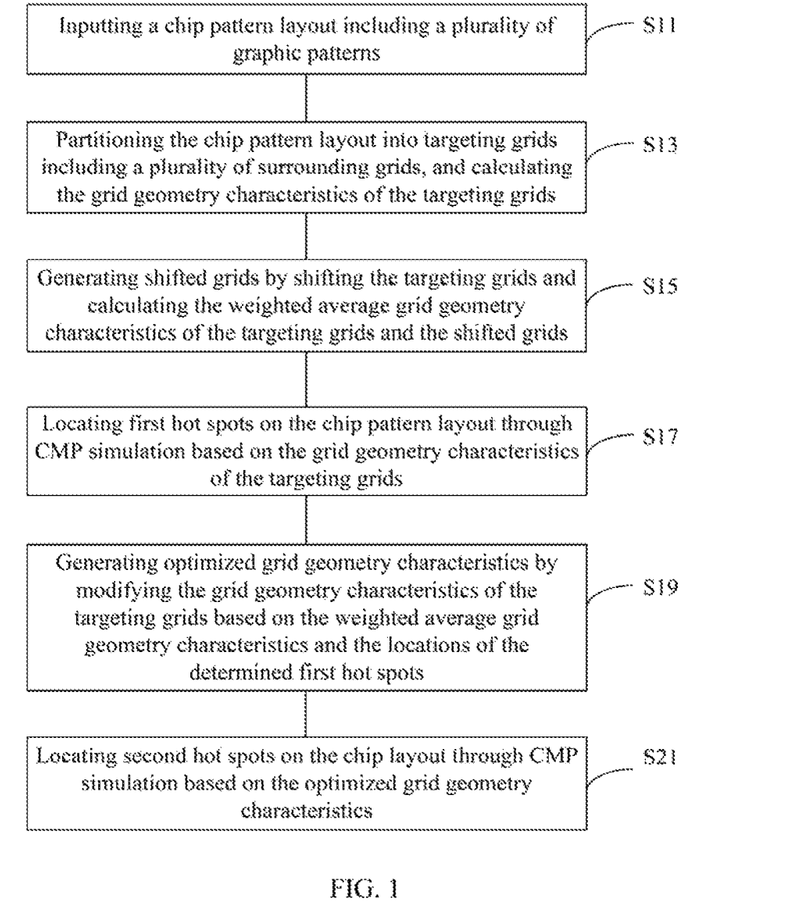
FIG. 1 illustrates a flowchart of an exemplary CMP simulation process consistent with various disclosed embodiments of the present disclosure.

The present disclosure provides a CMP simulation method to improve the accuracy of hot spot prediction for CMP process. FIG. 1 shows a flowchart of an exemplary CMP simulation process consistent with disclosed embodiments.

Referring to FIG. 1, at the beginning of the simulation process, a chip pattern layout may be inputted (S11). The chip pattern layout may include a plurality of graphic patterns.

Figure 2:
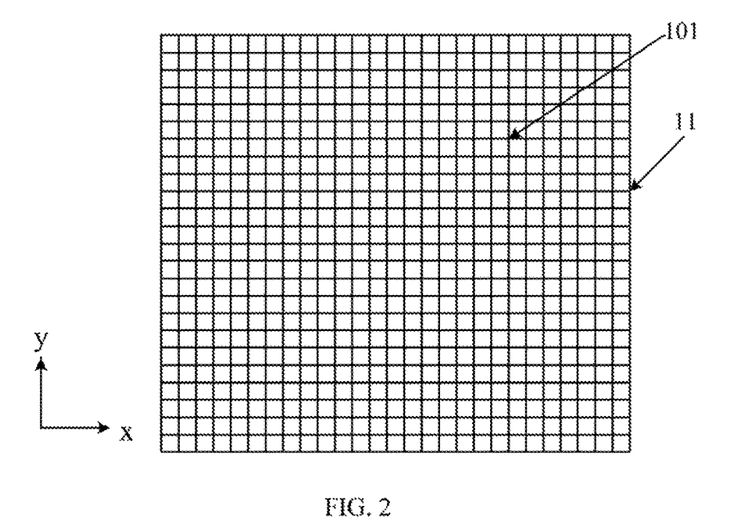
FIG. 2 illustrates a schematic view of exemplary targeting grids consistent with various disclosed embodiments of the present disclosure.

Further, the chip pattern layout may be partitioned into targeting grids including a plurality of surrounding grids, and the grid geometry characteristics of the targeting grids may then be calculated (S13). FIG. 2 shows a schematic view of exemplary targeting grids consistent with disclosed embodiments.

Referring to FIG. 2, the chip pattern layout may be partitioned into targeting grids 11 along a first direction x and a second direction y. The targeting grids 11 may include a plurality of surrounding grids 101. The plurality of surrounding grids in the targeting grids 11 may all have an identical shape and an identical size.

In one embodiment, the chip pattern layout may have a size of 1000 μm×1000 μm. The chip pattern layout may then be partitioned into 50×50 surrounding grids 101 along the first direction x and the second direction y. The 50×50 surrounding grids 101 may all have a same shape with identical dimensions. Therefore, each surrounding grid may have a square shape and may have a size of 20 μm×20 μm. The size of the surrounding grids 101 may be smaller than or equal to the planarization length of the chip pattern layout.

In other embodiments, the chip pattern layout may also be partitioned into targeting grids including a plurality of surrounding grids with different shapes and/or different sizes. For example, the surrounding grids may have a rectangular shape or a diamond shape.

Further, the grid geometry characteristics of the targeting grids may be calculated. The grid geometry characteristics of each surrounding grid may include parameters reflecting the occupied area, the distribution of the graphic patterns within the surrounding grid, the height of the graphic patterns relative to a reference plane, etc. For example, the grid geometry characteristics of a surrounding grid may include the pattern density, the linewidth of the graphic patterns, the perimeter of the graphic patterns, the height of the graphic patterns, etc.

In one embodiment, calculating the grid geometry characteristics of the targeting grids may include separately calculating the pattern density, the linewidth of the graphic patterns, and the perimeter of the graphic patterns for each surrounding grid.

In other embodiments, calculating the grid geometry characteristics of the targeting grids may include calculating the pattern density, the linewidth of the graphic patterns, the distance between the graphic patterns, etc. for each surrounding grid. In general, any geometric characteristics of the targeting grids that reflect the information of the graphic patterns and the surface height of the chip pattern layout may be calculated.

In one embodiment, the number of the surrounding grids along the first direction x in the targeting grids may be N and the number of the surrounding grids along the second direction y in the targeting grids may be M. That is, the targeting grids are formed as a matrix of surrounding grids with N columns arranged along the first direction x and M rows arranged along the second direction y. Moreover, surrounding grid (i, j) may then be used to denote a surrounding grid located at the $i^{th}$ column and $j^{th}$ row of the N×M matrix of the surrounding grids, where both i and j are positive integers with $1 \leq i \leq N$ and $1 \leq j \leq M$. Further, the number of graphic patterns included in the surrounding grid (i, j) may be T. In one embodiment, the method to calculate the grid geometry characteristics of the targeting grids may include the following aspects.

First, the pattern density in a surrounding grid (i, j) may be calculated through $d_{ij}=\Sigma_{t=1}^{T}d_t$, $d_t=S_t/(D_i \times D_j)$, where $S_t$ is the area size of the tth graphic pattern in the surrounding grid (i, j), $D_i \times D_j$ is the area size of the surrounding grid (i, j), and $d_t$ is of the contribution of $t^{th}$ graphic pattern to the pattern density of the surrounding grid (i, j).

Second, the linewidth of the graphic patterns in a surrounding grid (i, j) may be calculated through $w_{ij}=\Sigma_{t=1}^{T}w_tS_t/\Sigma_{t=1}^{T}S_t$, where $w_t$ is the linewidth of the $t^{th}$ graphic pattern in the surrounding grid (i, j), and $S_t$ is the area size of the $t^{th}$ graphic pattern in the surrounding grid (i, j).

Third, the perimeter of the graphic patterns in a surrounding grid (i, j) may be calculated through $p_{ij}=\Sigma_{t=1}^{T}p_t$, where $p_t$ is the perimeter of the $t^{th}$ graphic pattern in the surrounding grid (i, j). Specifically, $p_t$ is the total length of the edges of the $t^{th}$ graphic pattern inside the surrounding grid (i, j); that is, the length of the edges of the $t^{th}$ graphic pattern outside the surrounding grid (i, j) or the length of the edges of the $t^{th}$ graphic pattern at the boundary of the surrounding grid (i, j) may not be included in $p_t$.

Further, by successively changing the value of i from 1 to N and the value of j from 1 to M, the pattern density $d_{ij}$, the linewidth of the graphic patterns $w_{ij}$, and the perimeter of the graphic patterns $p_{ij}$ of each surrounding grid (i, j) may be calculated, and thus the grid geometry characteristics of the targeting grids may be obtained.

In one embodiment, the $t^{th}$ graphic pattern in the surrounding grid (i, j) may have a rectangular shape. Thus, according to the method described above, calculating the linewidth of the $t^{th}$ graphic pattern, $w_t$, is equivalent to calculating the width of the rectangle.

In other embodiments, the $t^{th}$ graphic pattern in the surrounding grid (i, j) may have an irregular shape. Accordingly, the method to calculate the linewidth of the $t^{th}$ graphic pattern, $w_t$, include the following steps. First, the $t^{th}$ graphic pattern may be divided into a number of sub graphic patterns with each sub graphic pattern having a rectangular shape. Then, the linewidth of each sub graphic pattern may be calculated through $w_t = \sum_{q=1}^{Q} w_{tq} S_{tq} / \sum_{q=1}^{Q} S_{tq}$, where Q is the number of the sub graphic patterns the $t^{th}$ graphic pattern divided into, $w_{tq}$ is the linewidth of the $q^{th}$ sub graphic pattern of the $t^{th}$ graphic pattern, and $S_{tq}$ is the area size of the $q^{th}$ sub graphic pattern of the $t^{th}$ graphic pattern.

Figure 3:
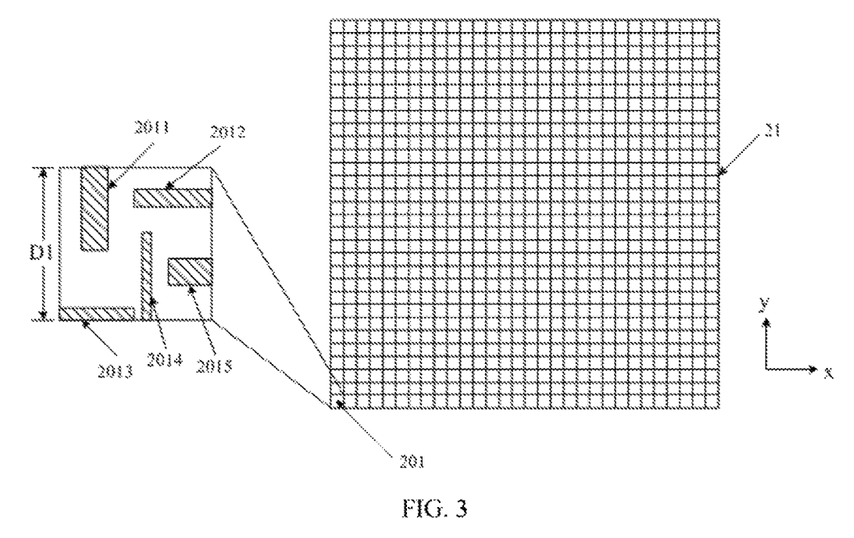
FIG. 3 illustrates a schematic view of graphic patterns in a surrounding grid of the targeting grids consistent with various disclosed embodiments of the present disclosure.

FIG. 3 shows a schematic view of graphic patterns in a surrounding grid of the targeting grids. Referring to FIG. 3, in one embodiment, a chip pattern layout is partitioned into targeting grids 21, and the targeting grids 21 include N×M=900 (N=30 and M=30) surrounding grids. The method to calculate the grid geometry characteristics of the targeting grids 21 may include the following steps.

The pattern density $d_{11}$, the linewidth of the graphic patterns $w_{11}$, and the perimeter of the graphic patterns $p_{11}$ of the sub grid 201, e.g. the sub grid (1,1), in the targeting grids 21 may be calculated. The area size of the sub grid 201 is $D_1 \times D_1$. The sub grid 201 may include five graphic patterns: a first graphic pattern 2011, a second graphic pattern 2012, a third graphic pattern 2013, a fourth graphic pattern 2014, and a fifth graphic pattern 2015. All the five graphic patterns have a rectangular shape. Further, the information of each graphic pattern including perimeter, area size, and linewidth may then be extracted. Specifically, the extracted information may include the perimeter $P_1$, the area size $S_1$, and the linewidth $W_1$ of the first graphic pattern 2011, the perimeter $P_2$, the area size $S_2$, and the linewidth $W_2$ of the second graphic pattern 2012, the perimeter $P_3$, the area size $S_3$, and the linewidth $W_3$ of the third graphic pattern 2013, the perimeter $P_4$, the area size $S_4$, and the linewidth $W_4$ of the fourth graphic pattern 2014, and the perimeter $P_5$, the area size $S_5$, and the linewidth $W_5$ of the fifth graphic pattern 2015. Because of the rectangular shape, the linewidth of each graphic pattern may be the width of the rectangle.

Moreover, the pattern density of the surrounding grid 201 may be calculated using $d_{11} = \sum_{t=1}^{5} d_t$, $d_t = S_t / (D_1 \times D_1)$, the linewidth of the graphic patterns may be calculated using $w_{11} = \sum_{t=1}^{5} w_t S_t / \sum_{t=1}^{5} S_t$, and the perimeter of the graphic patterns may be calculated using $p_{11} = \sum_{t=1}^{5} p_t$.

The method to calculate the grid geometry characteristics of the targeting grids 21 may further include calculating the pattern density $d_{12}$, the linewidth of the graphic patterns $w_{12}$, and the perimeter of the graphic patterns $p_{12}$ for the surrounding grids (1, 2), the pattern density $d_{13}$, the linewidth of the graphic patterns $w_{13}$, and the perimeter of the graphic patterns $p_{13}$ for the surrounding grid (1, 3), and so on, until the pattern density $d_{3030}$, the linewidth of the graphic patterns $w_{3030}$, and the perimeter of the graphic patterns $p_{3030}$ of the surrounding grid (30, 30) are obtained. As such, the pattern density, the linewidth of the graphic patterns, the perimeter of the graphic patterns for all the surrounding grids in the targeting grids 21 are calculated to obtain the grid geometry characteristics of the targeting grids 21.

In one embodiment, to obtain the grid geometry characteristics of the targeting grids, the calculations for the surrounding grids (i, j) may not be limited to any specific order. Any calculation process that can provide the pattern density $d_{ij}$, the linewidth of the graphic patterns $w_{ij}$, and the perimeter of the graphic patterns $p_{ij}$ for all the surrounding grids (i, j) in the targeting grids 21 may be adopted.

Further, returning to FIG. 1, the targeting grids may be shifted to obtain shifted grids, and weighted average grid geometry characteristics of the targeting grids and the shifted grids may be obtained through calculation (S15).

In one embodiment, a chip pattern layout may be partitioned into targeting grids along a first direction and a second direction. The targeting grids may include a plurality of surrounding grids with an identical shape and an identical size. The dimension of each surrounding grid along the first direction may be $D_i$ and the dimension of each surrounding grid along the second direction may be $D_j$. The targeting grids may then be shifted to obtain shifted grids. The shifted grids may be generated from the targeting grids by the following methods: first, the targeting grids may be shifted a distance of $D_i/n$ along the first direction to obtain first shifted grids; second, the targeting grids may be shifted a distance of $D_j/n$ along the second direction to obtain second shifted grids; and third, the targeting grids may be shifted a distance of $D_i/n$ along the first direction and then shifted a distance of $D_j/n$ along the second direction to obtain third shifted grids, where n is a positive integer.

Further, the method to calculate the weighted average grid geometry characteristics of the targeting grids and the shifted grids may include the following steps: calculating the grid geometry characteristics for the first shifted grids, the second shifted grids, and the third shifted grids, respectively, then using a weighted average method to calculate the weighted average grid geometry characteristics of the targeting grids, the first shifted grids, the second shifted grids, and the third shifted grids.

Figure 4:
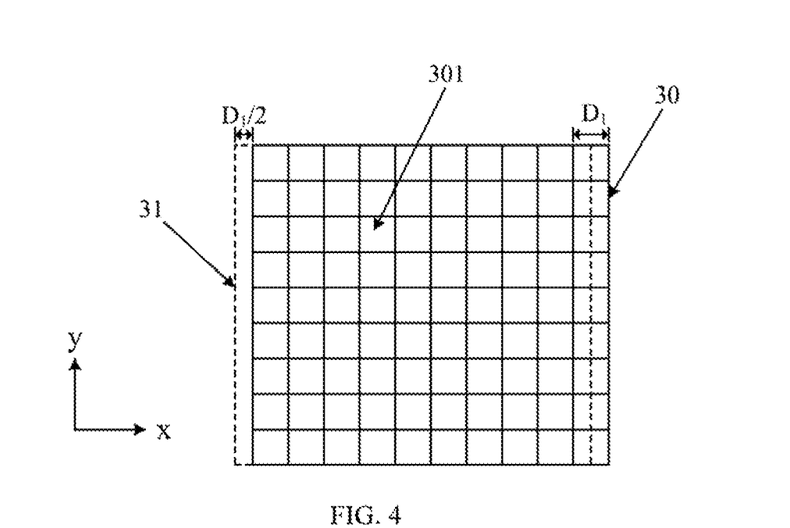
FIGS. 4-6 illustrate schematic diagrams for a method of generating various shifted grids adopted in an exemplary CMP simulation process consistent with various disclosed embodiments of the present disclosure.
Figure 5:
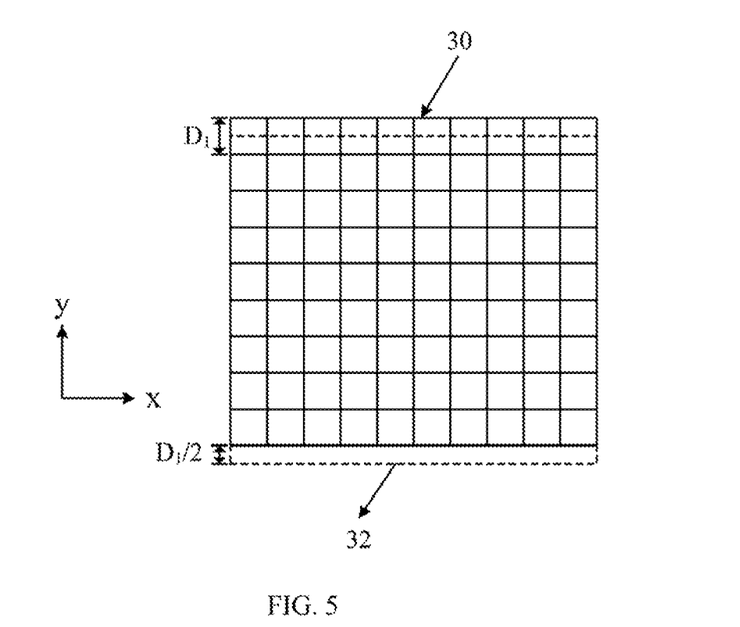
Figure 6:
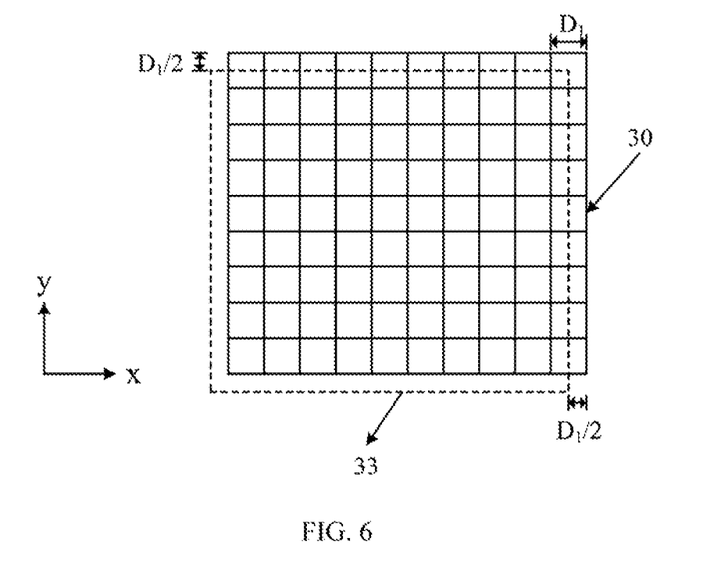

FIGS. 4-6 show schematic diagrams for a method adopted in an exemplary CMP simulation process to generate different shifted grids. Referring to FIGS. 4-6, in one embodiment, targeting grids 30 may include a plurality of surrounding grids with an identical shape and an identical dimension. The dimensions of a surrounding grid 301 along a first direction x and along a second direction y may be both equal to $D_i$. Further, to generate shifted surrounding grids, the surrounding grid 301 may be shifted a distance of $D_i/n$ along a first direction and/or along a second direction. In one embodiment, the number n may be 2. Accordingly, the targeting grids 30 may be shifted to obtain various shifted grids. The method to generate shifted grids may include shifting the targeting grids 30 a distance of $D_i/2$ along the first direction x to obtain first shifted grids 31 (indicated by dashed lines in FIG. 4), shifting the targeting grids 30 a distance of $D_i/2$ along the second direction y to obtain second shifted grids 32 (indicated by dashed lines in FIG. 5), and shifting the targeting grids 30 a distance of $D_i/2$ along the first direction x and then a distance of $D_i/2$ along the second direction y to obtain third shifted grids 33 (indicated by dashed lines in FIG. 6).

Further, the method to calculate the weighted average grid geometry characteristics of the targeting grids 30 and the shifted grids may include calculating the grid geometry characteristics of the first shifted grids 31, the grid geometry characteristics of the second shifted grids 32, and the grid geometry characteristics of the third shifted grids 33, respectively, and then using a weighted average method to calculate the weighted average grid geometry characteristics of the targeting grids 30, the first shifted grids 31, the second shifted grids 32, and the third shifted grids 33.

For example, calculating the grid geometry characteristics of the first shifted grids 31, the grid geometry characteristics of the second shifted grids 32, and the grid geometry characteristics of the third shifted grids 33 may include separately calculating the pattern density $d_{1ij}$, the linewidth of graphic patterns $w_{1ij}$, and the perimeter of graphic patterns $p_{1ij}$ for each surrounding grid (i, j) of the first shifted grids 31, the pattern density $d_{2ij}$, the linewidth of graphic patterns $w_{2ij}$, and the perimeter of graphic patterns $p_{2ij}$ for each surrounding grid (i, j) of the second shifted grids 32, and the pattern density $d_{3ij}$, the linewidth of graphic patterns $w_{3ij}$, and the perimeter of graphic patterns $p_{3ij}$ for each surrounding grid (i, j) of the third shifted grids 33, where the value of i is successively changed from 1 to N, while the value of j is successively changed from 1 to M. N is the number of the surrounding grids in the targeting grids 30 along the first direction x, while M is the number of the surrounding grids in the targeting grids 30 along the second direction.

The method to calculate the pattern density $d_{1ij}$, $d_{2ij}$, and $d_{3ij}$, the linewidth of graphic patterns $w_{1ij}$, $w_{2ij}$, and $w_{3ij}$, and the perimeter of graphic patterns $p_{1ij}$, $p_{2ij}$, and $p_{3ij}$ for the first shifted grids 31, the second shifted grids 32, and the third shifted grids 33 may be similar to the method adapted to calculate the pattern density $d_{0ij}$, the linewidth of graphic patterns $w_{0ij}$, and the perimeter of graphic patterns $p_{0ij}$ for the targeting grids 30 described above.

The weighted average grid geometry characteristics of the targeting grids 30 and the shifted grids may be obtained by using a weighted average method to average the grid geometry characteristics of the targeting grids 30, the first shifted grids 31, the second shifted grids 32, and the third shifted grids 33. The calculation of the weighted average grid geometry characteristics may include calculating the weighted average pattern density $\overline{d_{ij}}$, the weighted average linewidth of graphic patterns $\overline{w_{ij}}$, and the weighted average perimeter of graphic patterns $\overline{p_{ij}}$ for each surrounding grid (i, j).

Figure 7:
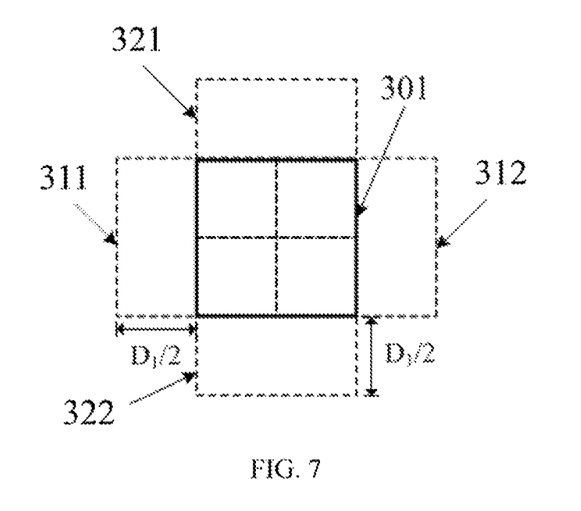
FIGS. 7-8 illustrate schematic diagrams for an exemplary method of calculating weighted average grid geometry characteristics of the targeting grids and corresponding shifted grids in an exemplary CMP simulation process consistent with various disclosed embodiments of the present disclosure.
Figure 8:
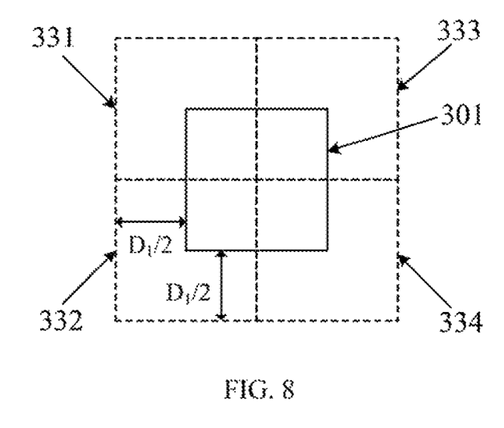

FIGS. 7-8 show schematic diagrams for an exemplary method used to calculate the weighted average grid geometry characteristics of a surrounding grid of the targeting grids and the corresponding shifted grids in an exemplary CMP simulation process.

Referring to FIGS. 7-8, nine surrounding grids are shown in the two figures. Specifically, a surrounding grid (i, j) of the targeting grids 30 is denoted as 301 in each figure; a surrounding grid (i, j) and a surrounding grid (i+1, j) of the first shifted grids 31 are denoted as 311 and 312, respectively; a surrounding grid (i, j) and a surrounding grid (i, j+1) of the second shifted grids 32 are denoted as 321 and 322, respectively; and surrounding grids (i, j), a surrounding grid (i+1, j), a surrounding grid (i, j+1), and a surrounding grid (i+1, j+1) of the third shifted grids 33 are denoted as 331, 332, 333, and 334, respectively.

Further, the weighted average pattern density of the surrounding grids (i, j) is given by $\overline{d_{ij}}(e_0 d_{0ij}+e_1 d_{1ij}+e_1 d_{1(i+1)j}+e_2 d_{2ij}+e_2 d_{2i(j+1)}+e_3 d_{3ij}+e_3 d_{3(i+1)j}+e_3 d_{3i(j+1)}+e_3 d_{3(i+1)(j+1)}/(e_0+2e_1+2e_2+4e_3)$, where $d_{0ij}$ is the pattern density of the surrounding grid 301: $d_{1ij}$ and $d_{1(i+1)j}$ are the pattern densities of the surrounding grids 311 and the surrounding grids 312, respectively; $d_{2ij}$ and $d_{2i(j+1)}$, are the pattern densities of the surrounding grid 321 and the surrounding grid 322, respectively; $d_{3ij}$, $d_{3(i+1)j}$, $d_{3i(j+1)}$, and $d_{3(i+1)(j+1)}$ are the pattern densities of the surrounding grid 331, the surrounding grid 332, the surrounding grid 333, and the surrounding grid 334, respectively: and $e_0$, $e_1$, $e_2$, and $e_3$ are first weight factors used to weight the surrounding grid 301 of the targeting grids 30, the surrounding grids 311 and 312 of the first shifted grids 31, the surrounding grids 321 and 322 of the second shifted grids 32, and the surrounding grids 331, 332, 333, and 334 of the third shifted grids 33, respectively in the formula to calculate the weighted average pattern density $\overline{d_{ij}}$.

The weighted average linewidth of graphic patterns of the surrounding grid (i, j) is given by $\overline{w_i}=f_0 w_{0ij}+f_1 w_{1ij}+f_1 w_{1(i+1)j}+f_2 w_{2ij}+f_2 w_{2i(j+1)}+f_3 w_{3ij}+f_3 w_{3(i+1)j}+f_3 w_{3i(j+1)}+f_3 w_{3(i+1)(j+1)}/(f_0+2f_1+2f_2+4f_3)$, where $w_{0ij}$ is the linewidth of graphic patterns of the surrounding grid 301: $w_{1ij}$ and $w_{1(i+1)j}$ are the linewidths of graphic patterns of the surrounding grid 311 and the surrounding grid 312, respectively; $w_{2ij}$ and $w_{2i(j+1)}$ are the linewidths of graphic patterns of the surrounding grid 321 and the surrounding grid 322, respectively; $w_{3ij}$, $w_{3(i+1)j}$, $w_{3i(j+1)}$, and $w_{3(i+1)(j+1)}$ are the linewidths of graphic patterns of the surrounding grid 331, the surrounding grid 332, the surrounding grid 333, and the surrounding grid 334, respectively; and $f_0$, $f_1$, $f_2$, and $f_3$ are second weight factors used to weight the surrounding grid 301 of the targeting grids 30, the surrounding grids 311 and 312 of the first shifted grids 31, the surrounding grids 321 and 322 of the second shifted grids 32, and the surrounding grids 331, 332, 333, and 334 of the third shifted grids 33, respectively in the formula to calculate the weighted average linewidth of graphic patterns $\overline{w_{ij}}$.

The weighted average perimeter of graphic patterns of the surrounding grid (i, j) is given by $\overline{p_i}=g_0 p_{0ij}+g_1 p_{1ij}+g_1 p_{1(i+1)j}+g_2 p_{2ij}+g_2 p_{2i(j+1)}+g_3 p_{3ij}+g_3 p_{3(i+1)j}+g_3 p_{3i(j+1)}+g_3 p_{3(i+1)(j+1)}/(g_0+2g_1+2g_2+4g_3)$, where $p_{0ij}$ is the perimeter of graphic patterns of the surrounding grid 301: $p_{1ij}$ and $p_{1(i+1)j}$ are the perimeters of graphic patterns of the surrounding grid 311 and the surrounding grid 312, respectively; $p_{2ij}$ and $p_{2i(j+1)}$ are the perimeters of graphic patterns of the surrounding grid 321 and the surrounding grid 322, respectively; $p_{3ij}$, $p_{3(i+1)j}$, $p_{3i(j+1)}$, and $p_{3(i+1)(j+1)}$ are the perimeters of graphic patterns of the surrounding grid 331, the surrounding grid 332, the surrounding grid 333, and the surrounding grid 334, respectively; and $g_0$, $g_1$, $g_2$, and $g_3$ are second weight factors used to weight the surrounding grid 301 of the targeting grids 30, the surrounding grids 311 and 312 of the first shifted grids 31, the surrounding grids 321 and 322 of the second shifted grids 32, and the surrounding grids 331, 332, 333, and 334 of the third shifted grids 33, respectively in the formula to calculate the weighted average perimeter of graphic patterns $\overline{p_{ij}}$.

According to the weighted average method, weight factors may be used to calculate the weighted average grid geometry characteristics such as the weighted average pattern density, the weighted average linewidth of graphic patterns, the weighted average perimeter of graphic patterns, etc. Further, in a subsequent process, the weighted average grid geometry characteristics may be used to modify the grid geometry characteristics of targeting grids and generate optimized grid geometry characteristics. As such, the optimized grid geometry characteristics may have the effect of surrounding grids taken into account.

In some cases, the first weight factors, the second weight factors, and the third weight factors may be obtained by a least square fitting method. In some of other cases, the first weight factors, the second weight factors, and the third weight factors may also be assigned with empirical values and the empirical values may then be modified based on CMP simulation results.

In one embodiment, the first weight factors may be $e_0=1$, $e_1=0.5$, $e_2=0.5$, and $e_3=0.25$; the second weight factors may be $f_0=1$, $f_1=0.5$, $f_2=0.5$, and $f_3=0.25$; and the third weight factors may be $g_0=1$, $g_1=0.5$, $g_2=0.5$, and $g_3=0.25$.

Moreover, when the targeting grids 30 are shifted to provide the first shifted grids 31, the second shifted grids 32, and the third shifted grids 33, the number of the surrounding grids in the shifted grids may remain unchanged. That is, the first shifted grids 31, the second shifted grids 32, and the third shifted grids 33 may all be N×M matrices of surrounding grids. Further, using the method described above to calculate the weighted average grid geometry characteristics of surrounding grids (N, j) or surrounding grids (i, M), the first shifted grids 31 may not be able to provide grid geometry characteristics for surrounding grids (N+1, j), the second shifted grids 32 may not be able to provide grid geometry characteristics for surrounding grid (i, M+1), and the third shifted grids 33 may not be able to provide grid geometry characteristics for surrounding grid (i, M+1), surrounding grid (N+1, j), and surrounding grid (N+1, M+1), where 1≤i≤N and 1≤j≤M.

In order to avoid the problem described above, in one embodiment, the first shifted grids 31 may have a series of extra surrounding grids (N+1, j), where 1≤j≤M. That is, the number of the surrounding grids included in the first shifted grids 31 may be (N+1)×M. Similarly, the second shifted grids 32 may have a series of extra surrounding grids (i, M+1), where 1≤i≤N. That is, the number of the surrounding grids included in the second shifted grids 32 may be N×(M+1). Moreover, the third shifted grids 33 may have an extra row of surrounding grids (i, M+1) and an extra column of surrounding grids (N+1, j), where 1≤i≤N and 1≤j≤M. That is, the number of the surrounding grids included in the third shifted grids 33 may be (N+1)×(M+1).

According to the method described above, the obtained weighted average grid geometry characteristics of the surrounding grid (i, j) are in fact the weighted average results of the surrounding grid (i, j) of the targeting grids 30 and the eight surrounding grids of the three shifted grids that are partially overlapping with the surrounding grid (i, j) of the targeting grids 30. The eight surrounding grids may include surrounding grids (i, j) and (i+1, j) of the first shifted grids 31, surrounding grids (i, j) and (I, J+1) of the second shifted grids 32, and surrounding grids (i, j), (i+1, j), (i, j+1), and (i+1, j+1) of the third shifted grids 33. Therefore, the weighted average grid geometry characteristics may reflect the long-range correlation effect between neighboring surrounding grids. Specifically, compared to the grid geometry characteristics of the targeting grids, the weighted average grid geometry characteristics may capture all grid geometry characteristics of the chip surface more precisely, and thus may avoid extracting inaccurate grid geometry characteristics for graphic patterns at the boundaries of surrounding grids due to grid partitioning.

Further, returning to FIG. 1, based on the extracted grid geometry characteristics of the targeting grids, CMP simulation may then be performed to locate first hot spots on the chip pattern layout (S17).

Specifically, a CMP simulation model may be selected. The pattern density $d_{ij}$, the linewidth of graphic patterns $w_{ij}$, and the perimeter of graphic patterns $p_{ij}$ of each surrounding grid in the targeting grids may be inputted as parameters for the CMP simulation model. Then, CMP simulation may be performed to locate the position of the first hot spots on the chip pattern layout. The CMP simulation model may be a process-based mathematical physics model that may be able to reflect corresponding process parameters and may simulate the process results of the designed layout.

In one embodiment, the chip may include a plurality of graphic patterns as well as a dielectric layer. In addition, a base plane may be defined as a plane with a height equal to an average height of the top surface of the graphic patterns and the top surface of the dielectric layer. After the CMP simulation process, a portion of the graphic patterns on the chip surface may have a height difference relative to the base plane exceeding 200 Å, and thus the corresponding spots on the chip surface may then be defined as the first hot spots.

In other embodiments, the chip may include a plurality of graphic patterns as well as a dielectric layer. After the CMP simulation process, the thickness of a portion of the graphic patterns on the chip surface may exceed 110% of a standard graphic pattern thickness, and thus the corresponding spots on the chip surface may then be defined as the first hot spots. Specifically, the standard graphic pattern thickness may be a preset thickness and the preset thickness may be determined according to process feature and experience by different technology nodes.

In one embodiment, the graphic patterns on the chip may be copper wires, the dielectric layer may be $SiO_x$, and after the CMP simulation process, a standard thickness of the copper wires may be 1500 Å. Accordingly, spots on the chip surface corresponding to copper wires with a thickness larger than 1650 (e.g. 1500+150) Å or smaller than 1350 (e.g. 1500-150) Å may be defined as first hot spots.

The first hot spots may not be limited to several specific definitions. In fact, different methods may be used to define the first hot spots. The first hot spots may be defined by methods based on actual requirements of the CMP process. The first hot spots may be defined by one or a combination of multiple definition methods.

Returning to FIG. 1, further, optimized grid geometry characteristics may be obtained by revising the grid geometry characteristics of the targeting grids based on the weighted average grid geometry characteristics of the targeting grids and the shifted grids, and also based on the defined first hot spots (S19). The method to obtain the optimized grid geometry characteristics may include using the weighted average grid geometry characteristics to replace the grid geometry characteristics of the surrounding grids that correspond to the defined first hot spots in the targeting grids; while the grid geometry characteristics of the surrounding grids in the targeting grids not corresponding to the first hot spots may remain unchanged.

In one embodiment, the first hot spots may be surrounding grids (g, h) of the targeting grids, where 1≤i≤N and 1≤j≤M, while both i and j are positive integers. Accordingly, the grid geometry characteristics of the surrounding grids (g, h) of the targeting grids, including the pattern density $d_{gh}$, the linewidth of graphic patterns $w_{gh}$, and the perimeter of graphic patterns $p_{gh}$ may be replaced by the weighted average grid geometry characteristics of the surrounding grids (g, h), including the weighted average pattern density $\overline{d_{gh}}$, the weighted average linewidth of graphic patterns $\overline{w_{gh}}$, and the weighted average perimeter of graphic patterns $\overline{p_{gh}}$. In addition, except for the surrounding grids defined as the first spots, the grid geometry characteristics for other surrounding grids (n, m) of the targeting grids, such as $d_{nm}$, $w_{nm}$, and $p_{nm}$ (1≤n≤N and 1≤m≤M; both n and m are positive integers; when n=g, then m≠h; and when m=h, n≠g), may remain unchanged. As such, the weighted average grid geometry characteristics $\overline{d_{gh}}$, $\overline{w_{gh}}$, and $\overline{p_{gh}}$ of the surrounding grids (g, h), i.e. the first hot spots, and the grid geometry characteristics $d_{nm}$, $w_{nm}$, and $p_{nm}$ of the other surrounding grids (n, m) in the targeting grids may together form the optimized grid geometry characteristics.

Further, returning to FIG. 1, based on the optimized grid geometry characteristics, CMP simulation may be performed to locate second hot spots on the chip pattern layout (S21).

Specifically, the method to locate the second hot spots may include the following steps. First, a CMP simulation model may be selected. The optimized grid geometry characteristics may be inputted as parameters for the CMP simulation model. Then, CMP simulation may be performed to locate the position of the second hot spots on the chip pattern layout. In one embodiment, the CMP simulation model may be a process-based mathematical physics model and the method to locate the second hot spots may be similar to the method to locate the first hot spots.

In one embodiment, the chip may include a plurality of graphic patterns as well as a dielectric layer. In addition, a base plane may be defined as a plane with a height equal to an average height of the top surface of the graphic patterns and the top surface of the dielectric layer. After the CMP simulation process, a portion of the graphic patterns on the chip surface may have a height difference relative to the base plane exceeding 200 Å, and thus the corresponding spots on the chip surface may then be defined as the second hot spots.

In other embodiments, the chip may include a plurality of graphic patterns as well as a dielectric layer. After the CMP simulation process, the thickness of a portion of the graphic patterns on the chip surface may exceed 110% of a standard graphic pattern thickness, and thus the corresponding spots on the chip surface may then be defined as the second hot spots. Specifically, the standard graphic pattern thickness may be a preset thickness and the preset thickness may be determined according to experience.

In one embodiment, the graphic patterns on the chip may be copper wires, the dielectric layer may be $SiO_x$, and after the CMP simulation process, a standard thickness of the copper wires may be 1500 Å. Accordingly, spots on the chip surface corresponding to copper wires with a thickness larger than 1650 (e.g. 1500+150) Å or smaller than 1350 (e.g. 1500-150) Å may be defined as second hot spots.

The second hot spots may not be limited to several specific definitions. In fact, different methods may be used to define the second hot spots. The second hot spots may be defined by methods based on actual requirements of the CMP process. The second hot spots may be defined by one or a combination of multiple definition methods.

According to the disclosed CMP simulation method, the weighted average grid geometry characteristics of the targeting grids and the shifted grids may be used to revise the grid geometry characteristics of the surrounding grids at the first hot spots of the targeting grids. Further, CMP simulation may be performed to locate the second hot spots existing on the chip pattern layout. Because the weighted average grid geometry characteristics may take the long-range correlation effect between neighboring surrounding grids in the targeting grids into account, the weighted average grid geometry characteristics may reflect the grid geometry characteristics of the surrounding grids at the defined first hot spots more accurately. Therefore, the possibility of having false prediction on the location of the second hot spots may be reduced, and thus the accuracy of the CMP simulation may be improved.

According to the disclosed CMP simulation method, after locating the first hot spots, only the grid geometry characteristics of the surrounding grids in the targeting grids corresponding to the first hot spots may be modified. The reasons to avoid using the average grid pattern characteristics to replace the grid geometry characteristics for all surrounding grids in the targeting grids lie in two aspects: first, revising the grid geometry characteristics of the surrounding grids only corresponding to the first hot spots may avoid introducing a series of problems, such as prediction error for individual points on the silicon wafer, change in the mean value of the prediction results for the entire silicon wafer, etc.; second, the partial modification for the grid geometry characteristics may also avoid introducing new hot spots and thus affecting the accuracy of the CMP simulation results.

Figure 9:
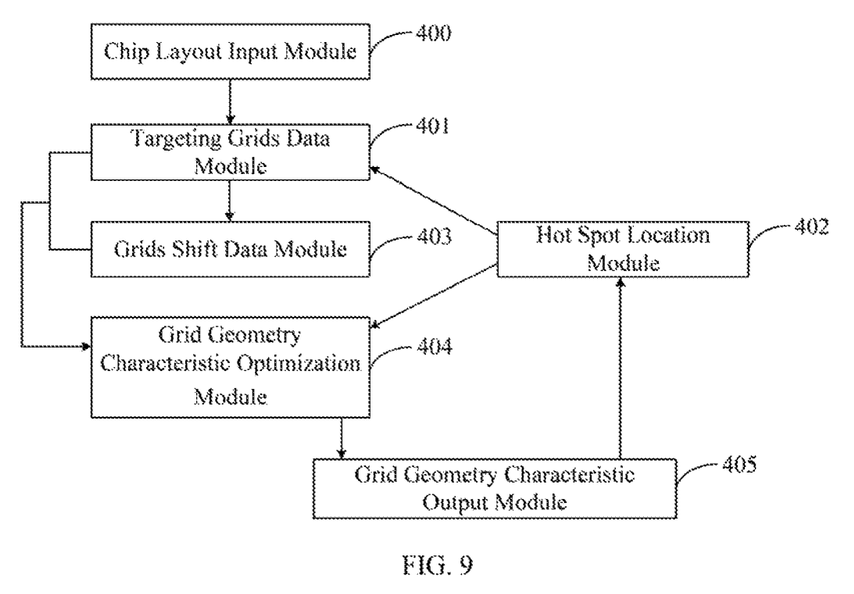
FIG. 9 illustrates a schematic view of the function modules in an exemplary CMP simulation device consistent with various disclosed embodiments of the present disclosure.

The present disclosure also provides a simulation device for CMP simulation. FIG. 9 shows a schematic view of the function modules in an exemplary CMP simulation process consistent with disclosed embodiments.

Referring to FIG. 9, the simulation device may include a chip pattern layout input module 400, a targeting grids data module 401, a hot spots location module 402, a grids shift data module 403, and a grid geometry characteristic optimization module 404.

Specifically, the chip pattern layout input module 400 may be used to input chip pattern layout which may include a plurality of graphic patterns. The targeting grids data module 401 may be used to partition the chip pattern layout into targeting grids. The targeting grids may include a plurality of surrounding grids. The targeting grids data module 401 may also calculate the grid geometry characteristics of the targeting grids. The hot spots location module 402 may be used to perform CMP simulation based on the grid geometry characteristics of the targeting grids. The CMP simulation may result in locating first hot spots existing on the chip pattern layout. The grids shift data module 403 may be used to create shifted grids by shifting the targeting grids. The grids shift data module 403 may also calculate the weighted average grid geometry characteristics of the targeting grids and the shifted grids. The grid geometry characteristic optimization module 404 may be used to revise the grid geometry characteristics of the targeting grids based on the weighted average grid geometry characteristics and the located first hot spots, and thus generate optimized grid geometry characteristics. Moreover, the hot spots location module 402 may also be used to perform CMP simulation to locate second hot spots based on the optimized grid geometry characteristics.

In one embodiment, the chip may include a plurality of graphic patterns as well as a dielectric layer. The definition of the first hot spots and the definition of the second hot spots may be the same: the portion of the chip surface with the top graphic patterns having a height difference relative to a base plane exceeding 200 Å after the CMP simulation process. Specifically, the base plane may be defined as a plane with a height equal to an average height of the top surface of the graphic patterns and the top surface of the dielectric layer.

In other embodiments, after the CMP simulation process, the first hot spots and/or the second hot spots may be defined as the portion of the chip surface with the top graphic patterns having a thickness exceeding 110% of a standard graphic pattern thickness. Specifically, the standard graphic pattern thickness may be a preset thickness and the preset thickness may be determined according to experience.

The first hot spots and/or the second hot spots may also be defined based on any other appropriate standards. Based on the actual requirements of the CMP process, the definition of the first hot spots and the definition of the second hot spots may or may not be the same.

In one embodiment, the grid geometry characteristics of the targeting grids may include three grid geometry characteristics: pattern density, linewidth of the graphic patterns, and perimeter of the graphic patterns. In other embodiments, the grid geometry characteristics of the targeting grids may include pattern density, linewidth of the graphic patterns, and distance between the graphic patterns, etc. In general, the grid geometry characteristics of the targeting grids may include any grid geometry characteristics that reflect the information of the graphic patterns on the chip pattern layout.

In one embodiment, the grids shift data module 403 may shift the targeting grids to obtain shifted grids, and then calculate the grid geometry characteristics for the shifted grids before using a weighted average method to calculate the weighted average grid geometry characteristics of the targeting grids and the shifted grids.

In one embodiment, the grid geometry characteristic optimization module 404 may revise the grid geometry characteristics of the targeting grids and thus generate optimized grid geometry characteristics. The method to obtain optimized grid geometry characteristics may include using the weighted average grid geometry characteristics to replace the grid geometry characteristics of surrounding grids that correspond to the defined first hot spots in the targeting grids; while the grid geometry characteristics of the surrounding grids in the targeting grids not corresponding to the first hot spots may remain unchanged. Thus, the weighted average grid geometry characteristics of the surrounding grids corresponding to the first hot spots together with the grid geometry characteristics of other surrounding grids (i.e. surrounding grids not corresponding to the first hot spots) may form the optimized grid geometry characteristics.

In one embodiment, the CMP simulation device may also include a grid geometry characteristic output module 405. The grid geometry characteristic output module 405 may be used to send the optimized grid geometry characteristics generated by the grid geometry characteristic optimization module 404 to the hot spots location module 402. The hot spots location module 402 may then perform CMP simulation to locate the second hot spots based on the inputted optimized grid geometry characteristics.

Compared to existing CMP simulation methods and existing CMP simulation devices, the disclosed CMP simulation method and simulation device may demonstrate several advantages.

According to the disclosed CMP simulation method, the chip pattern layout may be partitioned into targeting grids, and the grid geometry characteristics of the targeting grids may be calculated. Then, first hot spots may be obtained by performing CMP simulation using the grid geometry characteristics. The targeting grids may be shifted to obtain shifted grids and the weighted average grid geometry characteristics may then be calculated. Further, optimized grid geometry characteristics may be generated by using the weighted average grid geometry characteristics of the surrounding grids in the targeting grids to replace the grid geometry characteristics of the surrounding grids that correspond to the first hot spots. Finally, second hot spots may then be obtained by performing CMP simulation using the optimized grid geometry characteristics.

Because the weighted average grid geometry characteristics may take the long-range correlation effect between neighboring surrounding grids in the targeting grids into account, the weighted average grid geometry characteristics may reflect the grid geometry characteristics of the surrounding grids at the defined first hot spots more accurately. Therefore, the possibility of having false prediction on the location of the second hot spots may be reduced, and thus the accuracy of the CMP simulation may be improved.

Further, according to the disclosed CMP simulation methods, after locating the first hot spots, only the grid geometry characteristics of the surrounding grids in the targeting grids corresponding to the first hot spots may be modified. The reasons to avoid using the weighted average grid geometry characteristics to replace the grid geometry characteristics for all surrounding grids in the targeting grids lie in two aspects: first, revising the grid geometry characteristics of the surrounding grids corresponding only to the first hot spots may avoid introducing a series problems, such as prediction error for individual points on the silicon wafer, change in the mean value of the prediction results for the entire silicon wafer, etc.; second, the partial modification for the grid geometry characteristics may also avoid introducing new hot spots and thus affecting the accuracy of the CMP simulation results.

According to the disclosed CMP simulation device, the targeting grids data module may partition the chip pattern layout in to targeting grids and may then calculate the grid geometry characteristics for the targeting grids; the grids shift data module may generate weighted average grid geometry characteristics of the targeting grids and the shifted grids; the hot spot location module may perform CMP simulation to obtain first hot spots based on the grid geometry characteristics of the targeting grids; the grid geometry characteristic optimization module may generate optimized grid geometry characteristics by revising the grid geometry characteristics of the targeting grids based on the weighted average grid geometry characteristics and the defined first hot spots; and finally, the hot spot location module may perform CMP simulation to obtain second hot spots based on the optimized grid geometry characteristics.

Because the weighted average grid geometry characteristics may take the long-range correlation effect between neighboring surrounding grids in the targeting grids into account, the weighted average grid geometry characteristics may reflect the grid geometry characteristics of the surrounding grids at the defined first hot spots more accurately. Therefore, the possibility of having false prediction on the location of the second hot spots may be reduced, and thus the accuracy of the CMP simulation may be improved Further, the modules and the methods described above may be realized through electronic hardware, computer software, or a combination of the two. In order to express the interchangeability between hardware and software, the above modules and the methods are generally described based on their functions. Depending on specific application and design constrains, the functions may be realized by hardware, software, or a combination of the two.

Moreover, the modules and the methods described above may be performed directly by hardware, a software module for processor execution, or a combination of the two. The software module may be stored in a random-access memory (RAM), an internal memory, read-only memory (ROM), an electrically programmable ROM, an electrically erasable ROM, a register memory, a hard disk, a removable disk, a compact disc read-only memory (CD-ROM), or any other appropriate storage media.

Moreover, the disclosed CMP simulation device and CMP simulation methods may be used to predict the positions of hot spots on a wafer prior to performing a CMP process. According to the disclosed CMP simulation device and CMP simulation methods, the chip pattern layout may be partitioned into targeting grids, and the grid geometry characteristics of the targeting grids may be calculated. Then, first hot spots may be located through CMP simulation based on the grid geometry characteristics. Moreover, shifted grids may be generated from the targeting grids and weighted average grid geometry characteristics of targeting grids and the corresponding shifted grids may be calculated. Further, by replacing the grid geometry characteristics of the surrounding grids that correspond to the first hot spots with the weighted average grid geometry characteristics, optimized grid geometry characteristics may be obtained. Finally, second hot spots may be obtained through CMP simulation using the optimized grid geometry characteristics.

Because the weighted average grid geometry characteristics may take the long-range correlation effect between neighboring surrounding grids in the targeting grids into account, the weighted average grid geometry characteristics may reflect the grid geometry characteristics of the surrounding grids at the defined first hot spots more accurately. Therefore, as compared to existing simulation devices and simulation methods, the disclosed simulation device and simulation methods may effectively filter the false CMP hot spots and may also avoid introducing new false hot spots during the process to locate the second hot spots.

Moreover, because the positions of hot spots of a wafer after a CMP process may be accurately predicted, the role of CMP process parameters may be examined using the disclosed CMP simulation device and simulation methods. Therefore, the simulation results may help improving the selection of CMP process parameters.

In addition, with the positions of hot spots precisely determined, the simulation results may also help improving the chip pattern layout design so that problems caused by CMP, such as short circuits, graphic bridging, overly large resistance and/or capacitance, etc., may be reduced.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A chemical mechanical polishing (CMP) simulation method, comprising:
   inputting a chip pattern layout including a plurality of graphic patterns;
   partitioning the chip pattern layout into targeting grids and calculating grid geometry characteristics of the targeting grids, wherein:
      the targeting grids include a plurality of surrounding grids;
      the chip pattern layout is partitioned into the targeting grids along a first direction and a second direction, wherein the plurality of surrounding grids of the targeting grids all have an identical shape and an identical size, a dimension of each surrounding grid along the first direction is $D_i$, and a dimension of each surrounding grid along the second direction is $D_j$;
   generating shifted grids by shifting the targeting grids and calculating weighted average grid geometry characteristics of the targeting grids and the shifted grids, the shifted grids including first shifted grids, second shifted grids, and third shifted grids wherein:
      shifting the targeting grids to generate the shifted grids includes shifting the targeting grids a distance of $D_i/n$ along the first direction to form first shifted grids, shifting the targeting grids a distance of $D_j/n$ along the second direction to form second shifted grids, and shifting the targeting grids a distance of $D_i/n$ along the first direction and then a distance of $D_j/n$ along the second direction to form third shifted grids, wherein n is a positive integer;
   locating first hot spots on the chip pattern layout by performing a CMP simulation based on the grid geometry characteristics of the targeting grids;
   generating optimized grid geometry characteristics by modifying the grid geometry characteristics of the targeting grids based on the weighted average grid geometry characteristics of the targeting grids and the shifted grids and the defined first hot spots; and
   locating second hot spots on the chip pattern layout by performing the CMP simulation based on the optimized grid geometry characteristics.

2. The CMP simulation method according to claim 1, wherein:
   the chip pattern layout includes a dielectric layer in addition to the plurality of graphic patterns; and
   the first hot spots and the second hot spots are defined as a portion of the chip pattern layout with top graphic patterns having a height difference relative to a base plane exceeding 200 Å after a corresponding CMP simulation process, wherein:
      the dielectric layer isolates neighboring graphic patterns; and
      the base plane is defined as a plane with a height equal to an average height of top surfaces of the graphic patterns and a top surface of the dielectric layer.

3. The CMP simulation method according to claim 1, wherein:
   the chip pattern layout includes a dielectric layer in addition to the plurality of graphic patterns; and
   the first hot spots and the second hot spots are defined as a portion of the chip pattern layout with the top graphic patterns having a thickness exceeding 110% of a preset graphic pattern thickness, wherein:
   the dielectric layer isolates neighboring graphic patterns.

4. The CMP simulation method according to claim 1, wherein
   calculating the weighted average grid geometry characteristics of the targeting grids and the shifted grids includes:
   separately calculating grid geometry characteristics for the first shifted grids, the second shifted grids, and the third shifted grids; and
   calculating the weighted average grid geometry characteristics of the targeting grids and the shifted grids by calculating the grid geometry characteristics of the targeting grids, the first shifted grids, the second shifted grids, and the third shifted grids using a weighted average method.

5. The CMP simulation method according to claim 1, wherein:
   calculating the grid geometry characteristics of the targeting grids includes separately calculating pattern density, linewidth of graphic patterns, perimeter of graphic patterns for each surrounding grid of the targeting grids.

6. The CMP simulation method according to claim 5, wherein:
   the chip pattern layout is partitioned into the targeting grids along a first direction and a second direction, wherein the plurality of surrounding grids in the targeting grids form a matrix having N surrounding grids along the first direction and M surrounding grids along the second direction;
   a surrounding grids located at the ith column along the first direction and the jth row along the second direction is denoted as surrounding grids (i, j), where both i and j are positive integers with 1≤i≤N and 1≤j≤M;

a number of graphic patterns in the surrounding grids (i, j) is T; and a method to calculate the grid geometry characteristics of the targeting grids includes:

calculating a pattern density of the surrounding grids (i, j) through $d_{ij}=\Sigma_{t=1}^{T} d_t$, $d_t=S_t/(D_i \times D_j)$, where $S_t$ is an area size of a $t^{th}$ graphic pattern in the surrounding grids (i, j), $D_i \times D_j$ is an area size of the surrounding grids (i, j) and $d_t$ is of a contribution of $t^{th}$ graphic pattern to the pattern density of the surrounding grids (i, j);

calculating a linewidth of the graphic patterns of the surrounding grid (i, j) through $w_{ij}=\Sigma_{t=1}^{T} w_t S_t/\Sigma_{t=1}^{T} S_t$, where $w_t$ is a linewidth of the $t^{th}$ graphic pattern in the surrounding grids (i, j), and $S_t$ is the area size of the $t^{th}$ graphic pattern in the surrounding grids (i, j);

calculating a perimeter of the graphic patterns of the surrounding grid (i, j) through $p_{ij}=\Sigma_{t=1}^{T} p_t$, where $p_t$ is a total length of all edges of the $t^{th}$ graphic pattern inside the surrounding grids (i, j), and does not include a length of edges of the $t^{th}$ graphic pattern outside the surrounding grid (i, j) or at the boundary of the surrounding grid (i, j); and calculating a pattern density $d_{ij}$, a linewidth of the graphic patterns $w_{ij}$, and a perimeter of the graphic patterns $p_{ij}$ for each surrounding grid (i, j) of the targeting grids by successively changing i from 1 to N and j from 1 to M to obtain the grid geometry characteristics of the targeting grids.

7. The CMP simulation method according to claim 6, wherein:

the $t^{th}$ graphic pattern in the surrounding grids (i, j) has a rectangular shape; and the method to calculate the linewidth $w_t$ of the graphic patterns includes calculating the width of the rectangle.

8. The CMP simulation method according to claim 6, wherein the $t^{th}$ graphic pattern in the surrounding grids (i, j) has an irregular shape, the method to calculate the linewidth $w_t$ of the graphic patterns includes:

breaking the $t^{th}$ graphic pattern into a plurality of sub graphic patterns, wherein each sub graphic pattern has a rectangular shape;

calculating the linewidth of each sub graphic pattern of the $t^{th}$ graphic pattern; and calculating the linewidth of the $t^{th}$ graphic pattern through $w_t=\Sigma_{q=1}^{Q} w_{tq} S_{tq}/\Sigma_{q=1}^{Q} S_{tq}$, where Q is a number of the sub graphic patterns in the $t^{th}$ graphic pattern, $w_{tq}$ is the linewidth of the $q^{th}$ sub graphic pattern of the $t^{th}$ graphic pattern, and $S_{tq}$ is an area size of the qth sub graphic pattern of the $t^{th}$ graphic pattern.

9. The CMP simulation method according to claim 6, wherein locating the first hot spots on the chip pattern layout after performing CMP simulation based on the grid geometry characteristics of the targeting grids includes:

selecting a CMP simulation model; and performing CMP simulation using the pattern density $d_{ij}$, the linewidth of graphic patterns $w_{ij}$, and the perimeter of graphic patterns $p_{ij}$ of each surrounding grid as parameters to locate the first hot spots on the chip pattern layout.

10. The CMP simulation method according to claim 1, wherein generating the optimized grid geometry characteristics by modifying the grid geometry characteristics of the targeting grids based on the weighted average grid geometry characteristics of the targeting grids and the shifted grids and the defined first hot spots includes:

replacing the grid geometry characteristics with the weighted average grid geometry characteristics of the targeting grids and the shifted grids for surrounding grids corresponding to the first hot spots; and keeping the grid geometry characteristics for surrounding grids in the targeting grids not corresponding to the first hot spots.

11. The CMP simulation method according to claim 1, wherein performing CMP simulation to locate the second hot spots based on the optimized grid geometry characteristics includes:

selecting a CMP simulation model; and performing the CMP simulation using the optimized grid geometry characteristics as parameters to locate the second hot spots on the chip pattern layout.

12. A CMP simulation device, comprising:

a chip pattern layout input module, configured to input a chip pattern layout, wherein the chip pattern layout includes a plurality of graphic patterns;

a targeting grids data module, configured to partition the chip pattern layout into targeting grids, wherein:

the targeting grids include a plurality of surrounding grids, and the targeting grids data module also calculates grid geometry characteristics of the targeting grids;

the targeting grids data module partitions the chip pattern layout into the targeting grids along a first direction and a second direction, wherein the plurality of surrounding grids of the targeting grids all have an identical shape and an identical size, a dimension of each surrounding grid along the first direction is $D_i$, and a dimension of each surrounding grids along the second direction is $D_j$;

a hot spot location module, configured to perform a CMP simulation to locate first hot spots on the chip pattern layout based on the grid geometry characteristics of the targeting grids;

a grids shift data module, configured to shift the targeting grids and generate shifted grids, wherein the grids shift data module also calculates weighted average grid geometry characteristics of the targeting grids and the shifted grids, the shifted grids including first shifted grids, second shifted grids, and third shifted grids, wherein:

the grids shift data module shifts the targeting grids a distance of $D_i/n$ along the first direction to form first shifted grids, shifts the targeting grids a distance of $D_j/n$ along the second direction to form second shifted grids, and shifts the targeting grids a distance of $D_i/n$ along the first direction and then a distance of $D_j/n$ along the second direction to form third shifted grids, wherein n is a positive integer; and a grid geometry characteristic optimization module, configured to generate optimized grid geometry characteristics by modifying the grid geometry characteristics of the targeting grids based on the weighted average grid geometry characteristics of the targeting grids and the shifted grids and the defined first hot spots, wherein:

the hot spot location module also performs the CMP simulation to locate second hot spots on the chip pattern layout based on the optimized grid geometry characteristics.

13. The CMP simulation device according to claim 12, wherein:
- the chip pattern layout includes a dielectric layer in addition to the plurality of graphic patterns; and
- the first hot spots and the second hot spots are defined as a portion of the chip pattern layout with top graphic patterns having a height difference relative to a base plane exceeding 200 Å after a corresponding CMP simulation process, wherein:
  - the dielectric layer isolates neighboring graphic patterns; and
  - the base plane is defined as a plane with a height equal to an average height of top surfaces of the graphic patterns and a top surface of the dielectric layer.

14. The CMP simulation device according to claim 12, wherein:
- the chip pattern layout includes a dielectric layer in addition to the plurality of graphic patterns; and
- the first hot spots and the second hot spots are defined as a portion of the chip pattern layout with the top graphic patterns having a thickness exceeding 110% of a preset graphic pattern thickness, wherein:
  - the dielectric layer isolates neighboring graphic patterns.

15. The CMP simulation device according to claim 12, wherein the grid geometry characteristics of the targeting grids includes pattern density, linewidth of graphic patterns, perimeter of graphic patterns of each surrounding grid of the targeting grids.

16. The CMP simulation device according to claim 12, wherein after the grids shift data module generate shifted grids by shifting the targeting grids, the function of the grids shift data module further includes:
- calculating grid geometry characteristics of the shifted grids; and
- calculating the weighted average grid geometry characteristics of the targeting grids and the shifted grids using a weighted average method.

17. The CMP simulation device according to claim 12, wherein using the grid geometry characteristics optimization module to generate the optimized grid geometry characteristics by modifying the grid geometry characteristics of the targeting grids includes:
- replacing the grid geometry characteristics with the weighted average grid geometry characteristics of the targeting grids and the shifted grids for surrounding grids corresponding to the first hot spots;
- keeping the grid geometry characteristics for surrounding grids in the targeting grids not corresponding to the first hot spots; and
- the weighted average grid geometry characteristics of the targeting grids and the shifted grids of the surrounding grids corresponding to the first hot spots together with the grid geometry characteristics of the surrounding grids not corresponding to the first hot spots form the optimized grid geometry characteristics.

18. The CMP simulation device according to claim 12, further including:
- a grid geometry characteristic output module to send the optimized grid geometry characteristics generated in the grid geometry characteristic optimization module into the hot spot location module.

* * * * *